US008376604B2

(12) United States Patent
Hsu et al.

(10) Patent No.: US 8,376,604 B2
(45) Date of Patent: Feb. 19, 2013

(54) FRAME STRUCTURE OF BACKLIGHT MODULE

(75) Inventors: Ming-Ji Hsu, Hsinchu (TW); Chia-Hun Cheng, Hsinchu (TW); Chieh-Jen Cheng, Hsinchu (TW); Hsin-An Chang, Hsinchu (TW)

(73) Assignee: AU Optronics Corp, Hsin-Chu (TW)

( * ) Notice: Subject to any disclaimer, the term of this patent is extended or adjusted under 35 U.S.C. 154(b) by 352 days.

(21) Appl. No.: 12/897,294

(22) Filed: Oct. 4, 2010

(65) Prior Publication Data

US 2011/0085353 A1 Apr. 14, 2011

(30) Foreign Application Priority Data

Oct. 14, 2009 (TW) ................................ 98134846 A

(51) Int. Cl.
*F21V 17/10* (2006.01)
(52) U.S. Cl. ...................................... 362/633; 362/97.2

(58) Field of Classification Search .................. 362/632, 362/633, 92.1, 92.2
See application file for complete search history.

(56) References Cited

U.S. PATENT DOCUMENTS

2010/0045888 A1* 2/2010 Naritomi ......................... 349/58

FOREIGN PATENT DOCUMENTS

CN 1928655 A 3/2007

* cited by examiner

*Primary Examiner* — David V Bruce
(74) *Attorney, Agent, or Firm* — Morris Manning & Martin LLP; Tim Tingkang Xia, Esq.

(57) ABSTRACT

A frame structure of a backlight module includes a body and a mold frame. A side wall surrounds a bearing surface of the body, and the side wall has at least one stopper and at least one positioning hole. A side edge of the mold frame has at least one positioning post. When the mold frame is disposed on the side wall, the side edge of the mold frame leans against the stopper, and the positioning post of the mold frame is embedded in the positioning hole.

18 Claims, 9 Drawing Sheets

FRAME STRUCTURE OF BACKLIGHT MODULE

CROSS-REFERENCE TO RELATED APPLICATIONS

This non-provisional application claims priority under 35 U.S.C. §119(a) on Patent Application No(s). 098134846 filed in Taiwan, R.O.C. on Oct. 14, 2009, the entire contents of which are hereby incorporated by reference.

BACKGROUND OF THE INVENTION

1. Field of the Invention

The present invention relates to a frame structure, and more particularly to a frame structure of a backlight module.

2. Related Art

With the fast development of electronics technology, currently, various forms of electronic products are developed towards a diversified design trend, and the development and the design of electronic products being light, thin, short, and small become a mainstream on the market. The Liquid Crystal Display (LCD) is equipped with advantages being light and thin, power-saving, and radiation free, so currently, the LCD is greatly applied to various electronic products, such as a notebook computer, a Personal Digital Assistant (PDA), a digital camera, a camcorder, a mobile phone, and a handheld game machine, so that the electronic products achieve the light weight demand.

The LCD is mainly formed by a backlight module, a rear bezel, a Liquid Crystal Module (LCM), and an iron bezel. During assembly of the LCD, firstly the backlight module is disposed in the rear bezel. The backlight module is formed by a light guiding plate, a reflecting plate, a backlight source, and a backlight source holder. The light guiding plate is arranged above the reflecting plate, the backlight source holder is arranged on a side edge of the light guiding plate, and the backlight source is arranged in the backlight source holder. Then, the LCM is arranged above the backlight module, and leans against the rear bezel. Next, the rear bezel and the LCM are wrapped with the iron bezel, so as to complete the assembly operation of the LCD.

A mold frame is additionally disposed between the rear bezel and the LCM, so that when the LCM leans against the rear bezel, a proper pitch may be maintained between an optical film arranged on the LCM and the light guiding plate of the backlight module. However, for arrangement of the mold frame, generally, a binding material, such as an adhesive agent or a double-sided adhesive tape, is coated on or adhered to the rear bezel, then a side edge of the mold frame is aligned with a side edge of the rear bezel, and the mold frame is pressed on and adhered to the rear bezel, so that the mold frame is firmly bound with the rear bezel, thus, the optical film of the LCM is disposed on the mold frame.

However, during an operation process in which the mold frame is disposed on the rear bezel, contact surfaces of the mold frame and the rear bezel are flattened surfaces, so the no positioning mechanism exists between the mold frame and the rear bezel. When an operator performs an assembly operation between the mold frame and the rear bezel, generally the operator aligns a side edge of the mold frame with an edge of the rear bezel in a naked eye positioning manner, and then the mold frame is adhered to the rear bezel. Therefore, frequently, due to an improper operation of the operator, the mold frame is skew on the rear bezel, and a product yield after the assembly is lowered. Further, in order to precisely and alignedly adhere the mold frame to the rear bezel, the operator must spend quite a long time in positioning the mold frame and the rear bezel, so that problems of low performances and an increased cost of the assembly production exist.

SUMMARY OF THE INVENTION

In view of the above problems, the present invention is a frame structure of a backlight module, thereby solving a problem in a conventional backlight module that no positioning mechanism is disposed between a rear bezel and a mold frame, so the mold frame cannot be instantly, precisely, and alignedly adhered to the rear bezel, thus an efficiency of assembling the mold frame and the rear bezel is low and a product yield cannot be improved.

The present invention provides a frame structure of a backlight module, which comprises a body and a mold frame. The body has a bearing surface and a side wall, the side wall surrounds an edge of the bearing surface, and one end of the side wall far away from the bearing surface has at least one stopper and at least one positioning hole. A side edge of the mold frame has at least one positioning post. When the mold frame is disposed on the side wall of the body, the side edge of the mold frame leans against the stopper, and the positioning post is embedded in the positioning hole of the side wall.

The present invention further provides a frame structure of a backlight module, which comprises a body, a backlight source holder, and a mold frame. The backlight source holder and the mold frame are respectively disposed on the body, the backlight source holder has a bearing surface and a side wall, the side wall is disposed on an edge of the bearing surface, and one end of the side wall far away from the bearing surface has at least one stopper and at least one positioning hole. A side edge of the mold frame has at least one positioning post. When the mold frame is disposed on the body, the side edge of the mold frame leans against the stopper of the backlight source holder, and the positioning post of the mold frame is embedded in the positioning hole of the backlight source holder.

In the frame structure of the backlight module according to the present invention, the stopper and the positioning hole are disposed on the body or the backlight source holder, and the positioning post corresponding to the positioning hole is arranged on the mold frame. Therefore, through a positioning mechanism among the stopper, the positioning hole, and the positioning post, the mold frame is instantly and precisely disposed on the body, thereby greatly shortening assembly time, and preventing the mold frame from being skew on the body, so as to improve the product yield after the assembly.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 1:
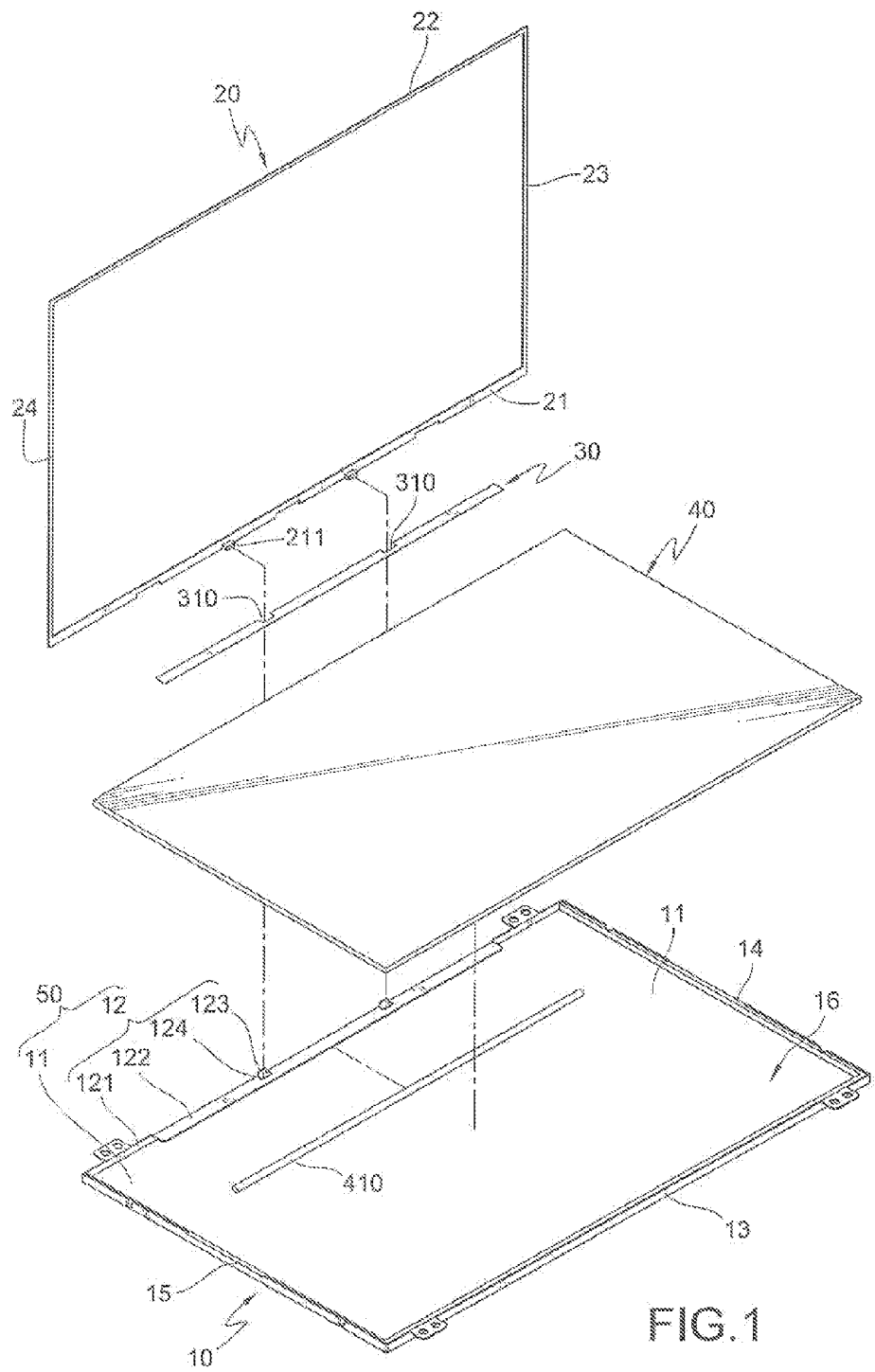
FIG. 1 is a schematic three-dimensional exploded view of an embodiment of the present invention.
Figure 2:
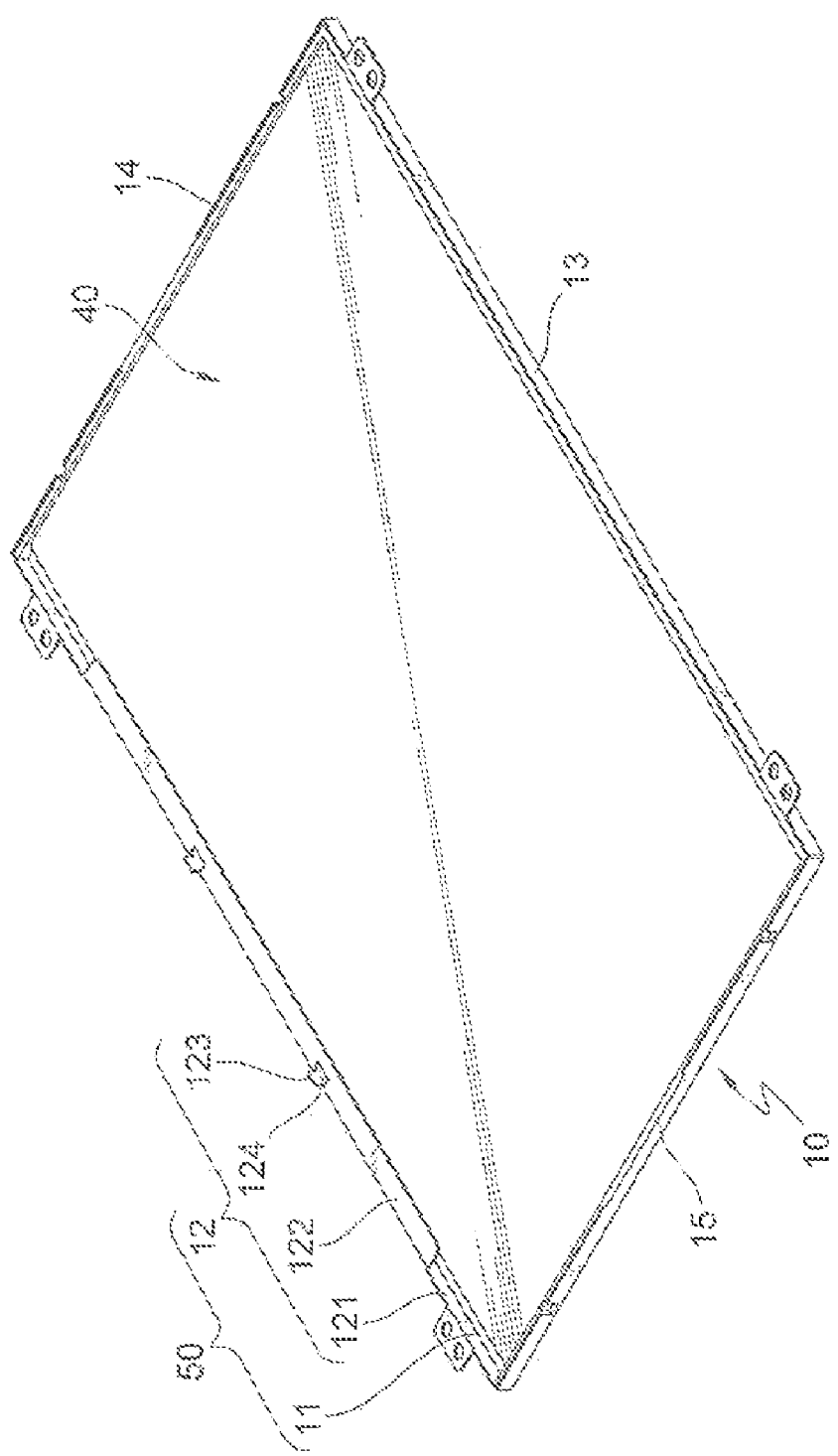
FIG. 2 is a schematic partial combined view of an embodiment of the present invention.
Figure 9:
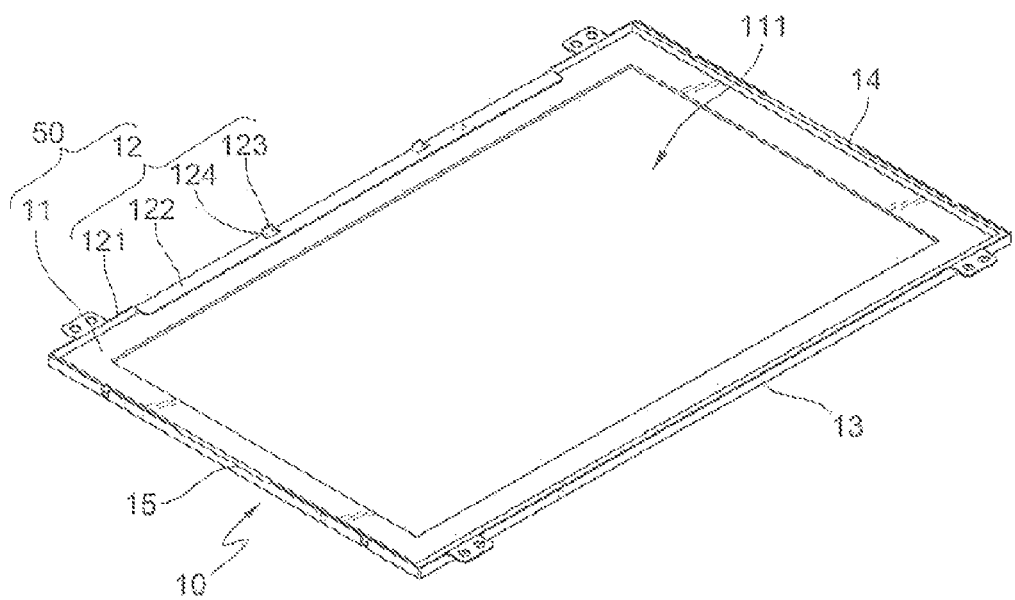
FIG. 9 is a schematic structural view of a body being a frame aspect according to an embodiment of the present invention.

Referring to FIGS. 1 and 2, a frame structure of a backlight module according to an embodiment of the present invention is used to bear the backlight module 40. The frame structure of the backlight module comprises a body 10 and a mold frame 20. The body 10 has a bearing surface 11, a first side wall 12, a second side wall 13 being opposite to the first side wall, and a third side wall 14 and a fourth side wall 15 being opposite to the third wall 14. The body 10 may be, but is not limited to, a flat-panel structure, or as shown in FIG. 9, an opening 111 is formed on the bearing surface 11 of the body 10, so that the body 10 becomes a frame aspect.

The first side wall 12, the second side wall 13, the third side wall 14, and the fourth side wall 15 surround edges of the bearing surface 11, and two ends of the first side wall 12 are connected to the third side wall 14 and the fourth side wall 15 respectively. Also, two ends of the second side wall 13 are connected to the third side wall 14 and the fourth side wall 15 respectively. Thus, a bearing space 16 is formed among the first side wall 12, the second side wall 13, the third side wall 14, the fourth side wall 15, and the bearing surface 11, and the backlight module 40 is disposed in the bearing space 16.

Figure 3:
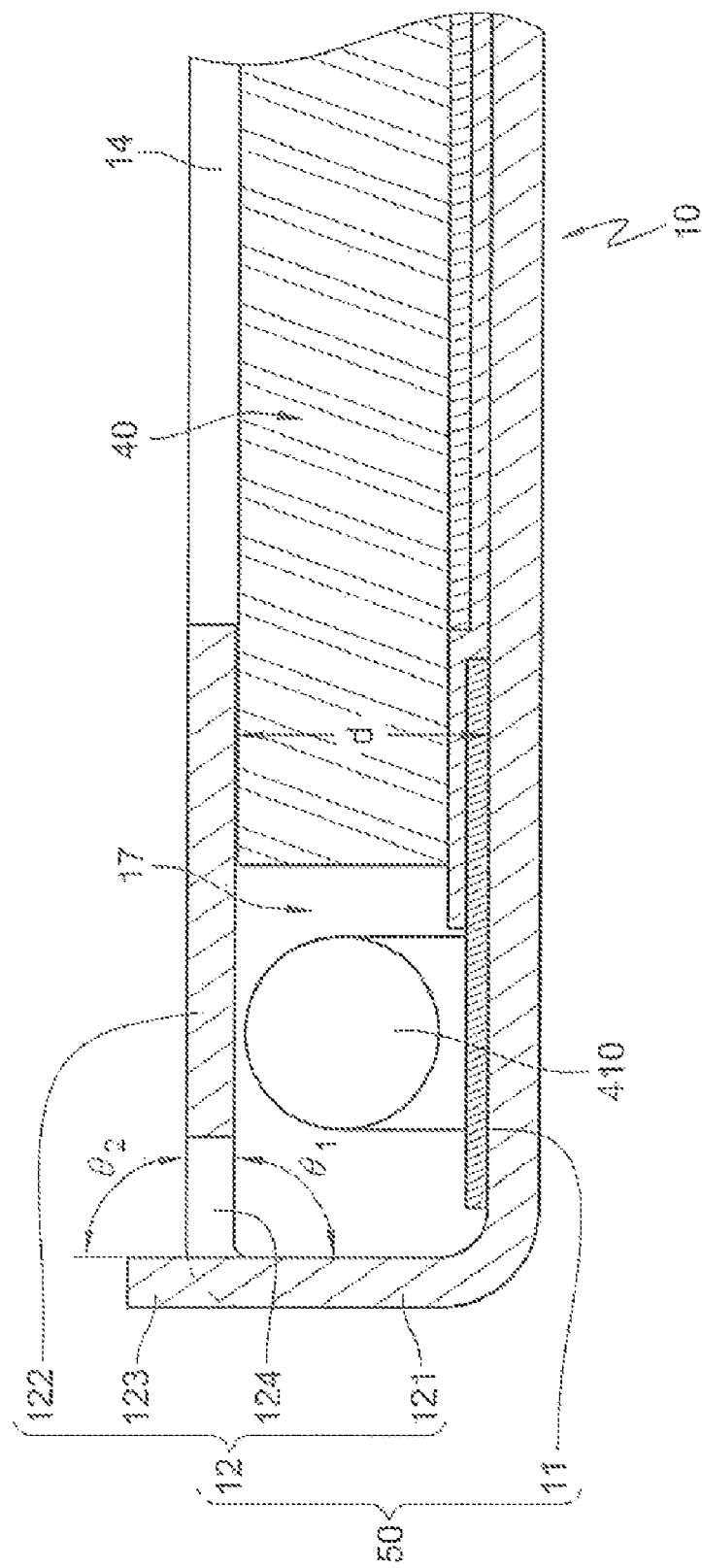
FIG. 3 is a schematic partial cross-sectional view of an embodiment of the present invention.
Figure 4:
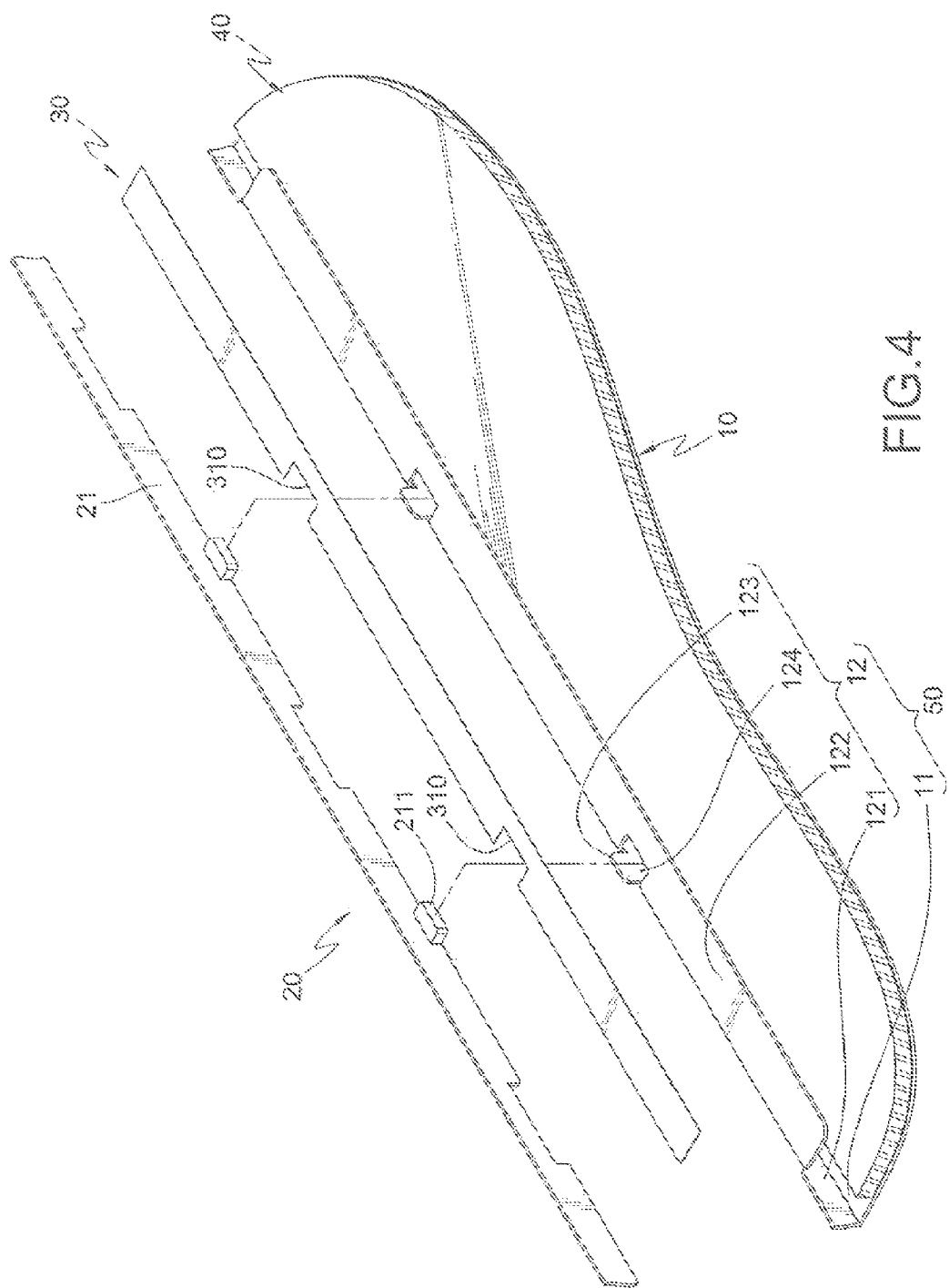
FIG. 4 is a schematic partial exploded view of an embodiment of the present invention.

As shown in FIGS. 3 and 4, the first side wall 12 has an erection section 121, a bending section 122, a plurality of stoppers 123, and a plurality of positioning holes 124. One end of the erection section 121 stands on the bearing surface 11, and the other end of the erection section 121 is far away from the bearing surface 11, and is connected with the bending section 122 and the plurality of stoppers 123. A first included angle $\theta_1$ is formed between the bending section 122 and the erection section 121, so that the bending section 122 is located above the bearing surface 11, and a pitch d is formed between the bending section 122 and the bearing surface 11. Therefore, an accommodation space 17 is formed among the erection section 121 of the first side wall 12, the bending section 122 of the first side wall 12, and the bearing surface 11 of the body 10. The accommodation space 17 further accommodates a backlight source 410 of the backlight module 40, so that the first side wall 12 and the bearing surface 11 of the body 10 form a backlight source holder 50 of the backlight module 40 (that is, the backlight source holder 50 is integrated with the body 10, so as to form an integrally formed structure shape).

Additionally, a second included angle $\theta_2$ is formed between the bending section 122 and each stopper 123, so that each stopper 123 protrudes from one side of the bending section 122 far away from the bearing surface 11. Meanwhile, an angular magnitude of the first included angle $\theta_1$ is equal to, but not limited to, an angular magnitude of the second included angle $\theta_2$. In this embodiment, a disposition manner in which both the angular magnitude of the first included angle $\theta_1$ and the angular magnitude of the second included angle $\theta_2$ are 90° in an equiangular relationship, so that the bending section 122 is parallel with the bearing surface 11, is illustrated as an example, but the present invention is not limited herein.

Figure 5:
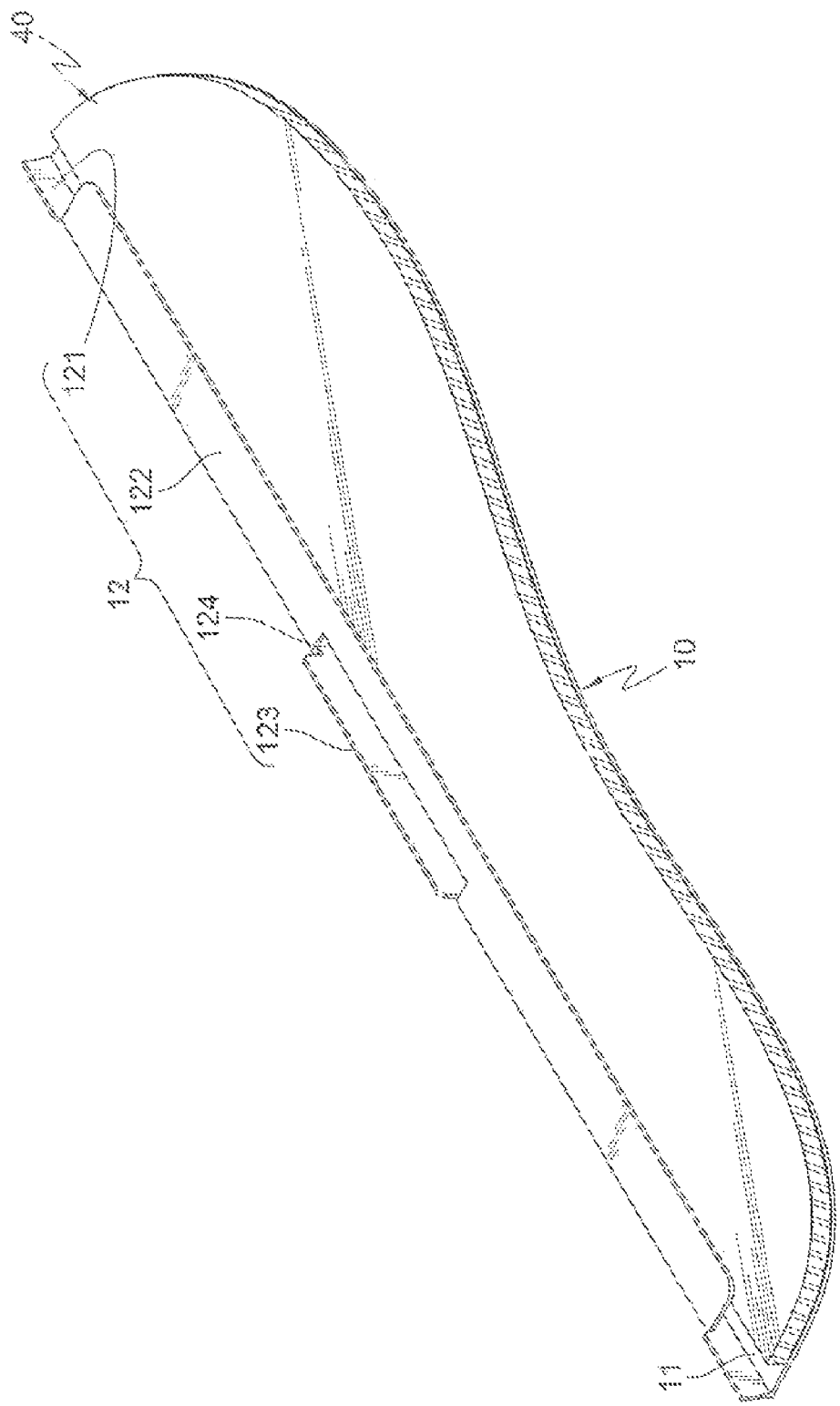
FIG. 5 is a schematic view of a structure having a single stopper and a single positioning hole according to an embodiment of the present invention.
Figure 6:
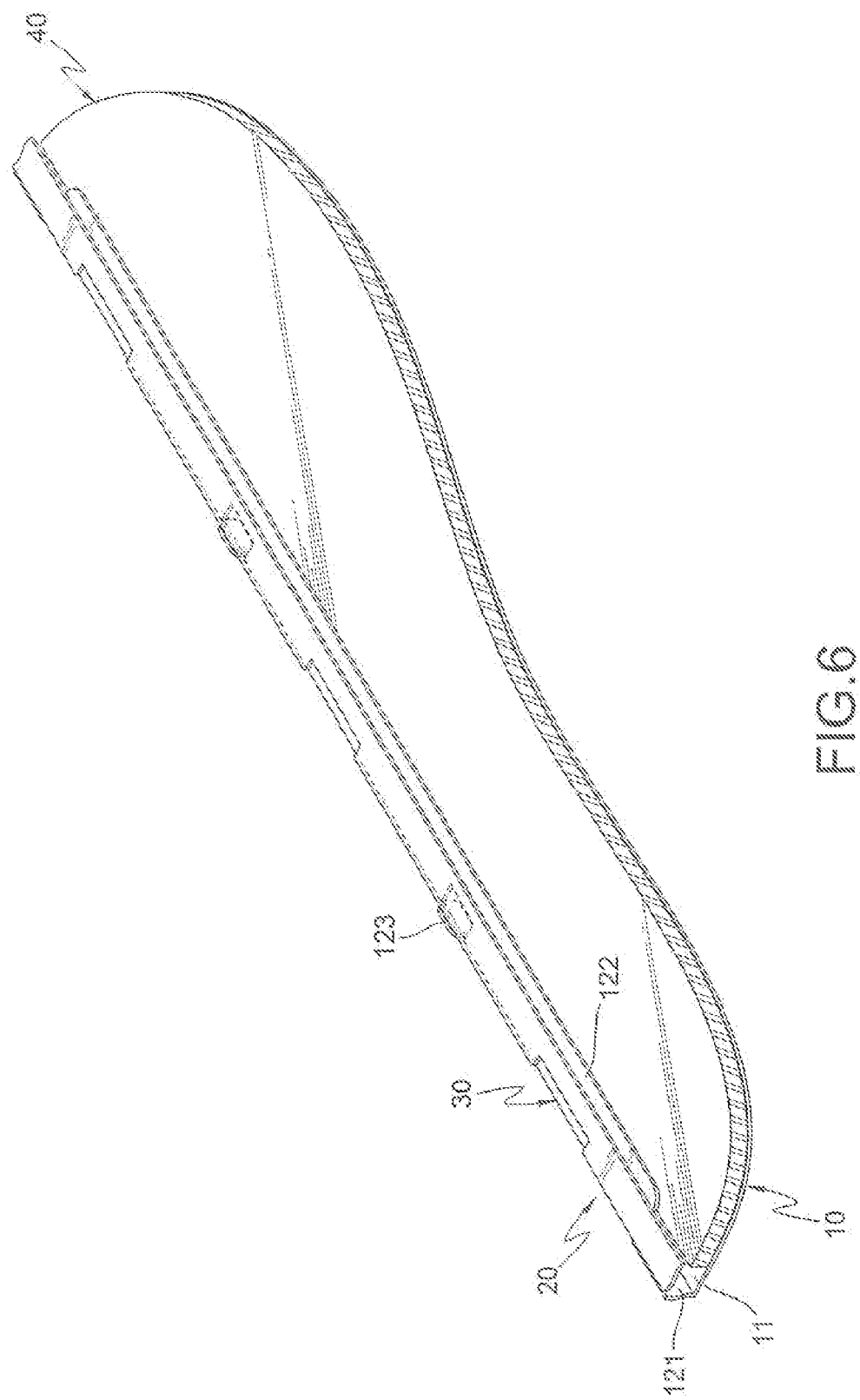
FIG. 6 is a schematic partial combined cross-sectional view of an embodiment of the present invention.
Figure 7:
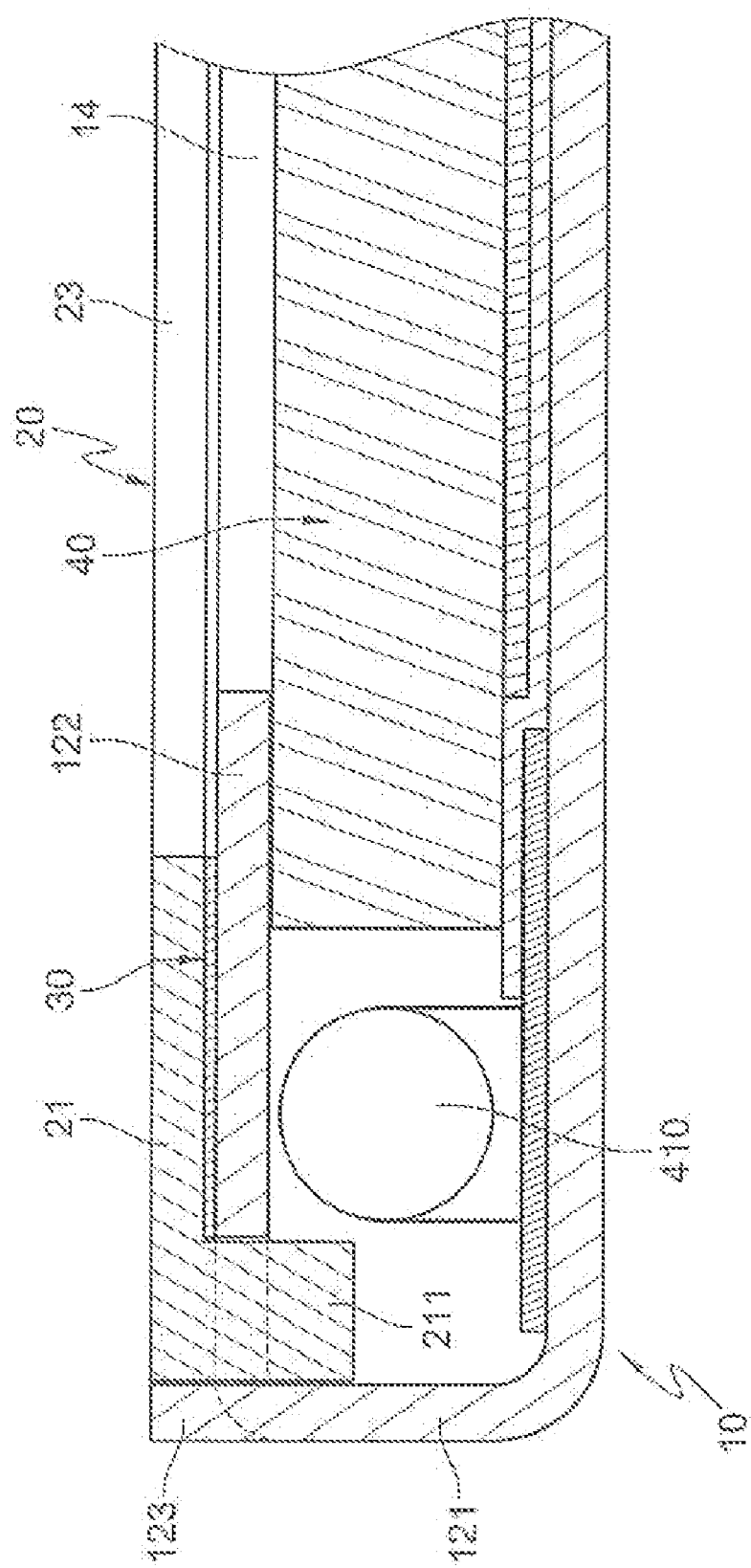
FIG. 7 is a schematic partial combined three-dimensional view of an embodiment of the present invention.

Refer to FIGS. 3 and 4, the plurality of positioning holes 124 of the first side wall 12 is disposed on the bending section 122. In this embodiment, the plurality of positioning holes 124 is respectively correspondingly disposed on one side of the bending section 122 adjacent to the plurality of stoppers 123, and is between the stoppers 123 and the bending section 122. A relative position of the stopper 123 with respect to the positioning hole 124, quantities of the stoppers 123 and the positioning holes 124, and sizes of the stopper 123 and the positioning hole 124 may be adjusted depending on actual cases. For example, in addition to the erection section 121 and the bending section 122, only a single stopper 123 and a single positioning hole 124 are arranged on the first side wall 12 (as shown in FIG. 5).

As shown in FIGS. 1, 3, and 4, the mold frame 20 has a first side edge 21 and a second side edge 22 opposite to the first side edge 21, and a third side edge 23 and a fourth side edge 24 opposite to the third side edge 23. Two ends of the first side edge 21 are connected with the third side edge 23 and the fourth side edge 24 respectively and two ends of the second side edge 22 are also connected with the third side edge 23 and the fourth side edge 24 respectively, so that the mold frame 20 forms a hollow frame structure. Furthermore, the first side edge 21, the second side edge 22, the third side edge 23, and the fourth side edge 24 of the mold frame 20 correspond to the first side wall 12, the second side wall 13, the third side wall 14, and the fourth side wall 15 of the body 10 respectively. A plurality of positioning posts 211 is arranged on positions on the first side edge 21 relative to the plurality of positioning holes 124 of the first side wall 12, and a quantity of the positioning posts 211 is equal to the quantity of the positioning holes 124. In this embodiment, two positioning holes 124 and two positioning posts 211 are illustrated as an example, but the present invention is not limited herein.

Referring to FIGS. 1, 3, 4, 6, and 7 simultaneously, when the mold frame 20 is bound with the body 10, a double-sided adhesive tape 30 (or other adhesive materials, such as an adhesive agent) may be selectively adhered to one side of the bending section 122 of the first side wall 12 opposite to the mold frame 20. Further, the double-sided adhesive tape 30 has two notches 310, disposition positions and sizes of the two notches 310 on the double-sided adhesive tape 30 match the two positioning holes 124 on the bending section 122. Therefore, when the double-sided adhesive tape 30 is adhered to the bending section 122, the two notches 310 correspond to the two positioning holes 124 respectively. Then, the mold frame 20 is disposed above the body 10, and the two positioning posts 211 of the first side edge 21 penetrate the two notches 310 of the double-sided adhesive tape 30 respectively, and are embedded in the two positioning holes 124, so that the first side edge 21 of the mold frame 20 is bound with the bending section 122 of the first side wall 12 through the double-sided adhesive tape 30. During the process, as the first side edge 21 is stopped by the stoppers 123 of the first side wall 12, a degree of freedom that the mold frame 20 on the body 10 horizontally moves relative to the body 10 is constrained. Therefore, after the first side edge 21 of the mold frame 20 is bound with the first side wall 12 of the body 10, an edge of the first side edge 21 leans against the stoppers 123, and is aligned with a position on which the erection section 121 and the bending section 122 of the first side wall 12 are connected, and the first side edge 21 is prevented from being skew when being adhered to the first side wall 12.

Next, the second side edge 22, the third side edge 23, and the fourth side edge 24 of the mold frame 20 are correspondingly adhered to the second side wall 13, the third side wall 14, and the fourth side wall 15 of the body 10, so that the mold frame 20 is bound with the body 10.

It is noted that in the embodiment of the present invention, relative arrangement relationships among the stoppers, the positioning holes, and the positioning posts comprise, but are not limited to, that the stoppers and the positioning holes are disposed on the first side wall of the body, and the positioning posts are disposed on the first side edge of the mold frame. In other embodiments of the present invention, the stoppers and the positioning holes can also be selectively disposed on each side wall of the body, and the corresponding positioning posts are disposed on each side edge of the mold frame. Alternatively, the corresponding stoppers, the corresponding positioning holes, and the corresponding positioning posts are disposed on one side wall and one side edge respectively.

Figure 8:
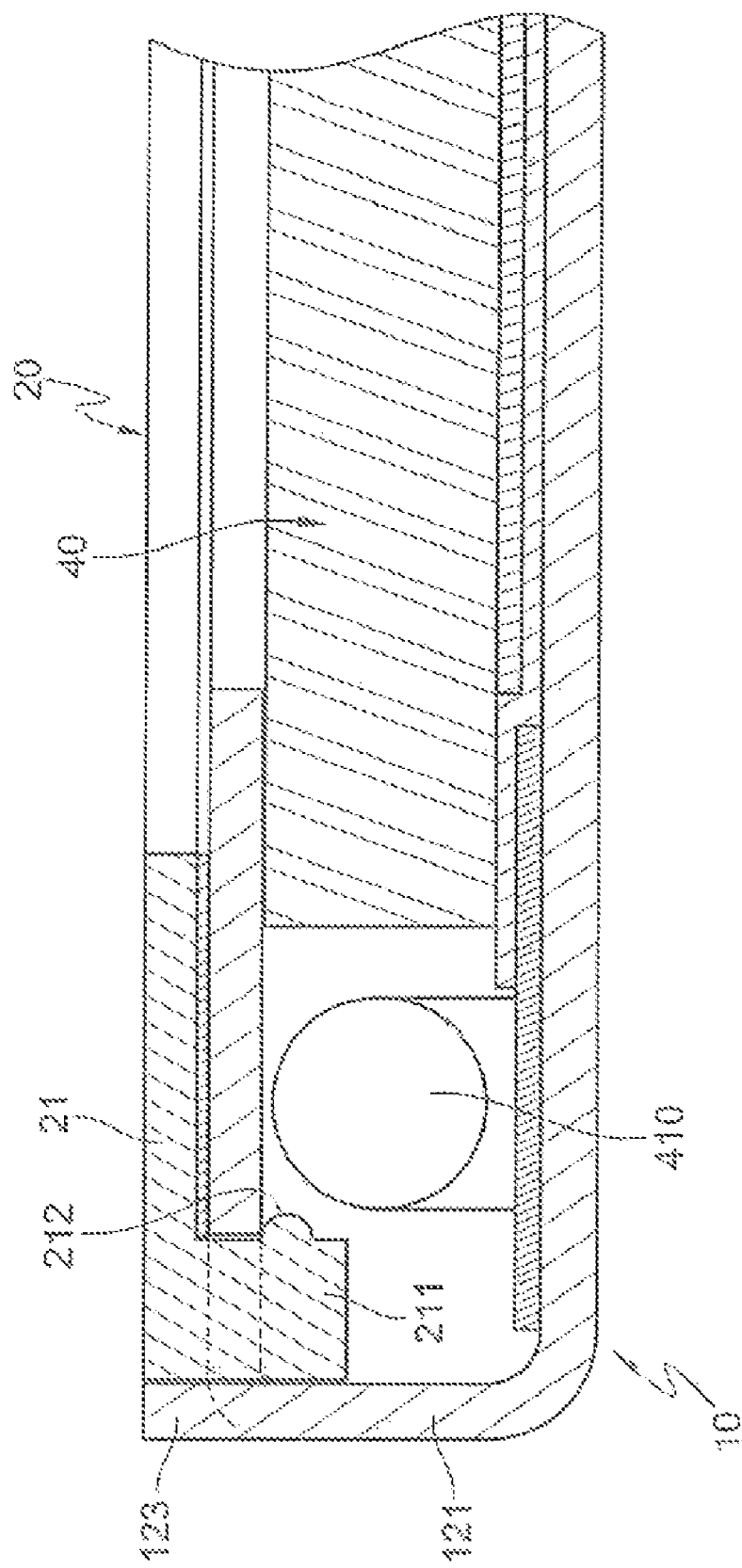
FIG. 8 is a schematic structural view of a positioning post having a bump according to an embodiment of the present invention.

Additionally, in order to enhance a binding strength between the first side edge 21 of the mold frame 20 and the first side wall 12 of the body 10, a bump 212 may be selectively arranged on the positioning post 211 of the first side edge 21. As shown in FIG. 8, the bump 212 protrudes from one side surface of the positioning post 211 adjacent to the backlight source 410. Therefore, after the positioning post 211 of the first side edge 21 is embedded in the positioning hole 124, the bump 212 on the positioning post 211 leans against one side of the bending section 122 opposite to the bearing surface 11, so as to prevent the first side edge 21 of the mold frame 20 from departing from the first side wall 12 of the body 10.

In the frame structure of the backlight module according to the present invention, the stoppers and the positioning holes are disposed on the side wall of the body, and the positioning posts corresponding to the positioning hole are arranged on the side edge of the mold frame. When performing an assembly operation of the mold frame and the body, an operator can instantly dispose the mold frame on the body through a positioning mechanism among the stoppers, the positioning holes, and the positioning posts, so as to greatly shorten assembly time, and ensure that the side edge of the mold frame is alignedly adhered to the side wall of the body, thereby improving a product yield after the assembly.

What is claimed is:

1. A frame structure of a backlight module, comprising:
a body, having a bearing surface and a side wall, wherein the side wall surrounds an edge of the bearing surface, and one end of the side wall far away from the bearing surface has at least one stopper and at least one positioning hole; and
a mold frame, wherein a side edge of the mold frame has at least one positioning post, the mold frame is disposed on the side wall, the side edge leans against the stopper, and the positioning post is embedded in the positioning hole.

2. The frame structure of the backlight module according to claim 1, wherein the side wall further has an erection section and a bending section, one end of the erection section stands on the bearing surface, the other end of the erection section is connected to the bending section and the stopper, a first included angle is formed between the bending section and the erection section, a second included angle is formed between the bending section and the stopper, and the positioning hole is disposed on the bending section.

3. The frame structure of the backlight module according to claim 2, wherein an angular magnitude of the first included angle is equal to an angular magnitude of the second included angle.

4. The frame structure of the backlight module according to claim 2, wherein the bending section is parallel with the bearing surface.

5. The frame structure of the backlight module according to claim 2, wherein the positioning hole is located on one side of the bending section adjacent to the stopper.

6. The frame structure of the backlight module according to claim 2, wherein the positioning post of the mold frame has a bump, the bump protrudes from the positioning post, the positioning post is embedded in the positioning hole, and the bump leans against one side of the bearing surface opposite to the bending section.

7. The frame structure of the backlight module according to claim 1, further comprising an adhesive material, disposed on the side wall of the body, and between the side edge of the mold frame and the side wall.

8. The frame structure of the backlight module according to claim 7, wherein the adhesive material is selected from one of a double-sided adhesive tape and an adhesive agent.

9. The frame structure of the backlight module according to claim 8, wherein the double-sided adhesive tape has at least one notch, and the notch matches and corresponds to the positioning hole of the body.

10. A frame structure of a backlight module, comprising:
a body;
a backlight source holder, disposed on the body, and having a bearing surface and a side wall, wherein the side wall is disposed on an edge of the bearing surface, and one end of the side wall far away from the bearing surface has at least one stopper and at least one positioning hole; and
a mold frame, wherein a side edge of the mold frame has at least one positioning post, the mold frame is disposed on the body, the side edge leans against the stopper of the backlight source holder, and the positioning post is embedded in the positioning hole.

11. The frame structure of the backlight module according to claim 10, wherein the side wall of the backlight source holder further has an erection section and a bending section, one end of the erection section stands on the bearing surface, the other end of the erection section is connected to the bending section and the stopper, a first included angle is formed between the bending section and the erection section, a second included angle is formed between the bending section and the stopper, and the positioning hole is disposed on the bending section.

12. The frame structure of the backlight module according to claim 11, wherein an angular magnitude of the first included angle is equal to an angular magnitude of the second included angle.

13. The frame structure of the backlight module according to claim 11, wherein the bending section is parallel with the bearing surface.

14. The frame structure of the backlight module according to claim 11, wherein the positioning hole is located on one side of the bending section adjacent to the stopper.

15. The frame structure of the backlight module according to claim 11, wherein the positioning post of the mold frame has a bump, the bump protrudes from the positioning post, the positioning post is embedded in the positioning hole, and the bump leans against one side of the bending section opposite to the bearing surface.

16. The frame structure of the backlight module according to claim 10, further comprising an adhesive material, disposed on the side wall of the body, and between the side edge of the mold frame and the side wall.

17. The frame structure of the backlight module according to claim 16, wherein the adhesive material is selected from one of a double-sided adhesive tape and an adhesive agent.

18. The frame structure of the backlight module according to claim 17, wherein the double-sided adhesive tape has at least one notch, and the notch matches and corresponds to the positioning hole of the body.

* * * * *